United States Patent
Takahashi

Patent Number: 5,903,763
Date of Patent: May 11, 1999

[54] METHOD OF RECOVERING EXCLUSIVE CONTROL INSTRUCTION AND MULTI-PROCESSOR SYSTEM USING THE SAME

[75] Inventor: Hajime Takahashi, Kawasaki, Japan

[73] Assignee: Fujitsu Limited, Kawasaki, Japan

[21] Appl. No.: 08/955,718

[22] Filed: Oct. 22, 1997

Related U.S. Application Data

[63] Continuation of application No. 08/583,525, Jan. 5, 1996, abandoned, which is a continuation of application No. 08/215,635, Mar. 22, 1994, abandoned.

[30] Foreign Application Priority Data

Mar. 26, 1993 [JP] Japan ..................................... 5-068265

[51] Int. Cl.⁶ ................................................ G06F 13/00
[52] U.S. Cl. ........................ 395/726; 395/728; 711/148
[58] Field of Search .......................... 395/841, 200.74, 395/672, 726, 727, 728; 711/150–153, 148, 155, 163

[56] References Cited

U.S. PATENT DOCUMENTS

| | | | |
|---|---|---|---|
| 4,574,350 | 3/1986 | Starr | 364/200 |
| 4,827,399 | 5/1989 | Shibayama | 364/200 |
| 5,138,713 | 8/1992 | Loten | 395/725 |
| 5,197,148 | 3/1993 | Blount et al. | 395/575 |
| 5,226,143 | 7/1993 | Baird et al. | 395/425 |
| 5,237,694 | 8/1993 | Horne et al. | 395/725 |
| 5,276,848 | 1/1994 | Gallagher et al. | 395/425 |
| 5,291,442 | 3/1994 | Emma et al. | 395/425 |
| 5,297,269 | 3/1994 | Donaldson et al. | 395/425 |
| 5,305,448 | 4/1994 | Insalaco et al. | 395/425 |
| 5,339,443 | 8/1994 | Lockwood | 395/725 |
| 5,341,491 | 8/1994 | Ramanujan | 395/425 |
| 5,390,186 | 2/1995 | Murata et al. | 371/10.1 |
| 5,469,573 | 11/1995 | McGill, III et al. | 395/700 |
| 5,581,750 | 12/1996 | Haderle et al. | 395/618 |
| 5,592,673 | 1/1997 | Kurabayashi et al. | 395/726 |

FOREIGN PATENT DOCUMENTS 4-128957  4/1992  Japan .

Primary Examiner—Ayaz R. Sheikh
Assistant Examiner—Paul R. Myers
Attorney, Agent, or Firm—Staas & Halsey

[57] ABSTRACT

A method of recovering an exclusive control instruction in a computer system having a plurality of processor modules and a plurality of shared memory modules which are coupled via a system bus. At least a part of the shared memory modules forms a dual construction. The exclusive control instruction makes access from an arbitrary one of the processor modules to the shared memory modules. First, a read access is performed to a master shared memory module from the arbitrary processor module in response to the exclusive control instruction. Thereafter, a write access is performed to a slave shared memory module, which forms a pair with the master shared memory module from the arbitrary processor module, so as to rewrite data in the slave shared memory module. Finally, a write access is performed to the master shared memory module from the arbitrary processor module, so as to rewrite data in the master shared memory module.

14 Claims, 15 Drawing Sheets

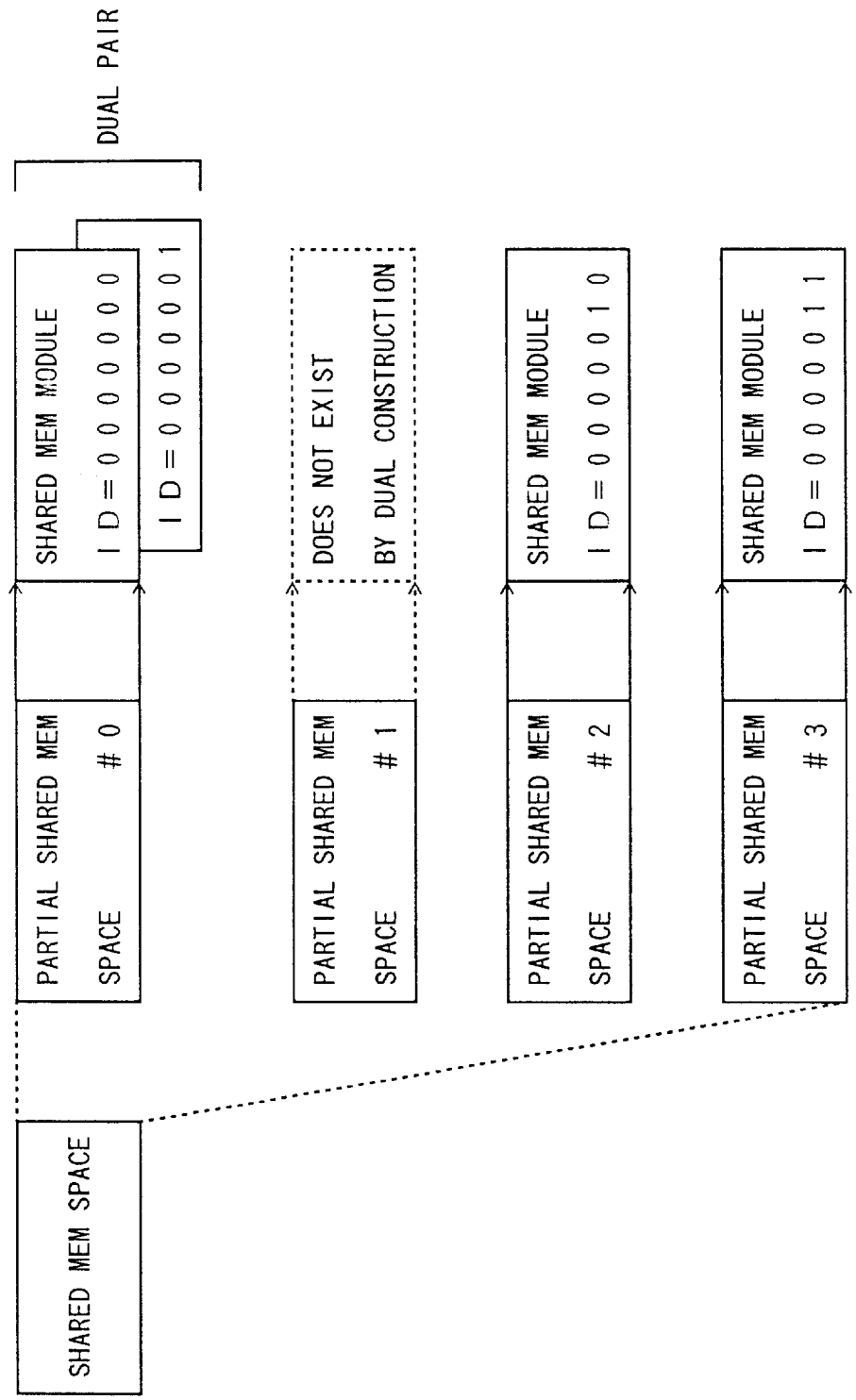

F I G. 5A

F I G. 5B

F I G. 1 4
```
P P P P P P P P P             P
M M M M M M M M M   ········  M
0 1 2 3 4 5 6 7 8            31
```
F I G. 1 5
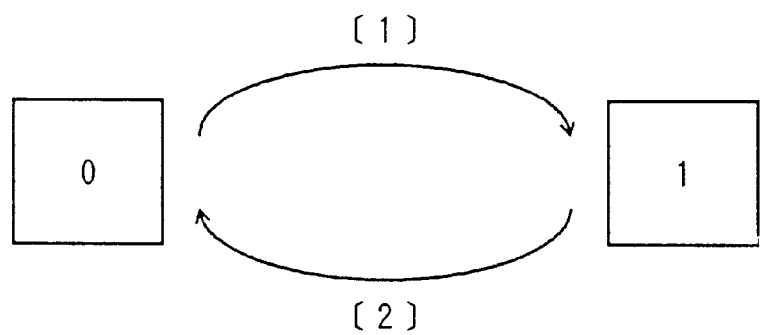

METHOD OF RECOVERING EXCLUSIVE CONTROL INSTRUCTION AND MULTI-PROCESSOR SYSTEM USING THE SAME

This application is a continuation of application Ser. No. 08/583,525, filed Jan. 5, 1996, now abandoned, which is a continuation of application Ser. No. 08/215,635, filed Mar. 22, 1994, now abandoned.

BACKGROUND OF THE INVENTION

The present invention generally relates to methods of recovering exclusive control instructions and multi-processor systems using the same, and more particularly to a method of recovering an exclusive control instruction related to dual shared memories which are shared by a plurality of processors, and to a multi-processor system using such a method.

A multi-processor system executes separate processes in a plurality of processors so as to improve the performance of the system as a whole. In such a multi-processor system, an exclusive control must be made among the processors for the purpose of avoiding a contention related to the resource.

As a method of realizing the exclusive control, there is a system which provides an area for exclusive control in a shared memory to which an access can be made from all of the processors, and gives the right to use the resource exclusively depending on the content within this area. According to this system, all of the processors carry out the same procedure, that is, the content is first read and the write is made by checking whether or not the conditions match, and the access from another processor during the series of operations is prohibited. In addition, when the shared memory has a dual construction, the shared memory modules from which all of the processors make the read operation must have the same construction, and the rewrite operation must be made with respect to both the shared memory modules forming the dual construction.

The present invention relates to the method of recovering the exclusive control instruction in a computer system which is provided with the shared memory modules having the dual construction, when an abnormal termination of the exclusive control instruction occurs due to intermittent (occasional) failure or the like of the system.

FIG. 1 is a diagram for explaining the operation of executing the exclusive control instruction in a conventional computer system which includes shared memories having the dual construction. FIG. 1 shows a case where data are written into the shared memories.

In FIG. 1, a shared memory module 171 includes a shared memory unit 171a and a bus connection unit 171b, and a shared memory module 172 includes a shared memory unit 172a and a bus connection unit 172b. These shared memory units 171 and 172 for the dual construction. The shared memory units 171a and 172a are coupled to a system bus 173 via the respective bus connection units 171b and 172b. For example, the shared memory module 171 has a unit identification (ID) which is ID=0000000, and the shared memory module 172 has a unit ID which is ID=0000001.

On the other hand, a processor module 174 includes a central processing unit (CPU) 174a, a main memory 174b and a bus connection unit 174c which connects the system bus 173 and the CPU 174a or the like. For example, the processor module 174 has a unit ID which is ID=1100000. Actually, a plurality of such processor modules 174 are connected to the system bus 173.

In FIG. 1, when the CPU 174a of the processor module 174 executes an exclusive control instruction, the read operation with respect to the shared memory module is first recognized by the bus connection unit 174c, and the bus connection unit 174c makes access to the shared memory module 171 in the master system (hereinafter simply referred to as the master shared memory module 171) having the ID=0000000 to make the read operation. The data in an exclusive control region of the master shared memory module 171 are read out as indicated by "(1)R" in FIG. 1, and the processor module 174 judges whether or not the read data match with expected value. If the data do not match, it is regarded that the exclusive control has failed, and the process advances to a next instruction by terminating this instruction.

On the other hand, when the data match, the operation of rewriting the contents of the shared memory modules 171 and 172 is started. When the bus connection unit 174c recognizes this rewriting operation, an access is first made to the master shared memory module 171 having the ID=0000000 to make a write operation as indicated by "(2)MW" in FIG. 1. After receiving a notification indicating a normal termination, an access is made to the shared memory module 172 of a slave system (hereinafter simply referred to as the slave shared memory module 172) having the ID=0000001 to make a write operation as indicated by "(3)SW" in FIG. 1. When a notification indicating a normal termination of the write operation to the slave shared memory module 172 is received, the bus connection unit 174c notifies the termination to the CPU 174a, and the exclusive control instruction is terminated.

The bus connection unit 174c makes an abnormality notification to the CPU 174a in synchronism with the exclusive control instruction when an abnormality is detected during the read access to either the master or slave shared memory module 171 or 172, the write access to the master shared memory module 171, and the write access to the slave shared memory module 172. In response to this abnormality notification, the CPU 174a checks the contents of the abnormality notification, and the process is continued by retrying (or re-executing) the exclusive control instruction if a recovery is possible. But if the recovery is impossible, the CPU 174a judges by itself that the operation is impossible and comes to a halt, so as to make a macro recovery using other processor modules.

For example, the recovery becomes impossible when the abnormal termination of the exclusive control instruction occurs even though the write operation is made to the master shared memory module 171 or, the rewriting to the master shared memory module 171 cannot be guaranteed. In such cases, even if the exclusive control instruction is retried, the data in the master shared memory module 171 is already rewritten, and the data read from the master shared memory module 171 will not match with the expected value.

When the recovery is impossible, the CPU of the certain processor module halts itself and expects other processor modules to make the recovery. When the other processor modules detect the halt of the CPU of the certain processor module, the other processor modules release the exclusive control region acquired by this CPU. In other words, the other processor modules write back the contents of the exclusive control region of the master shared memory module, and the resource becomes usable again by carrying out this process. In addition, the process of the halted CPU is retried from the start by the CPUs of the other processor modules based on inherit information stored in the shated memory module.

Therefore, when the abnormal termination of the exclusive control access cannot be recovered, the conventional system had problems in that the processor module must be halted and the recovery had to be made by the other processor modules, and the load of the recovery process was large.

SUMMARY OF THE INVENTION

Another and more specific object of the present invention is to provide a novel and useful method of recovering exclusive control instructions and a multi-processor systems using the same, in which the problems described above are eliminated.

Another and more specific object of the present invention is to provide a method of recovering an exclusive control instruction in a computer system including a plurality of processor modules and a plurality of shared memory modules which are coupled via a system bus, where at least a part of the shared memory modules forms a dual construction, the exclusive control instruction makes access from an arbitrary one of the processor modules to the shared memory modules, and the method comprises the steps of (a) making a read access to a master shared memory module from the arbitrary processor module in response to the exclusive control instruction, (b) making a write access to a slave shared memory module which forms a pair with the master shared memory module from the arbitrary processor module after the step (a) so as to rewrite data in the slave shared memory module, and (c) making a write access to the master shared memory module from the arbitrary processor module after the step (b) so as to rewrite data in the master shared memory module. According to the method of the present invention, even if an abnormal termination of the exclusive control instruction occurs during the read access to the master or slave shared memory module or the write access to the slave shared memory module, it becomes possible to retry the exclusive control instruction because the write access to the master shared memory module has not yet been made at this stage. As a result, it is possible to minimize the possibility of the processor module from coming to a halt by itself, thereby improving the reliability and availability of the system.

Still another object of the present invention is to provide the method described above, which further comprises the step of (d) providing a flag indicative of whether or not the data in the master shared memory module are rewritten by the step (c), where the flag is accessible from each of the processor modules. According to the method of the present invention, even when an abnormality is generated during the write access to the master shared memory module, it is possible to judge whether or not the data in the master shared memory module have been rewritten by referring to the flag, and retry the exclusive control instruction if no rewriting of data has been made with respect to the master shared memory module. Hence, it is possible to further reduce the possibility of terminating the exclusive control instruction due to the abnormality, thereby further improving the reliability and availability of the system.

A further object of the present invention is to provide a multi-processor system comprising a plurality of processor modules, a plurality of shared memory modules accessible from each of the processor modules, where at least a part of the shared memory modules forms a dual construction, and a system bus coupling the processor modules and the shared memory modules, where an arbitrary one of the processor modules executes an exclusive control instruction which makes access to a master shared memory module and a slave shared memory module which form a pair out of the shared memory modules, and the arbitrary processor module comprises first means for making a read access to the master shared memory module in response to the exclusive control instruction, second means for making a write access to the slave shared memory module after carrying out the read access of the first means so as to rewrite data in the slave shared memory module, and third means for making a write access to the master shared memory module after carrying out the write access of the second means so as to rewrite data in the master shared memory module. According to the multi-processor system of the present invention, even if an abnormal termination of the exclusive control instruction occurs during the read access to the master or slave shared memory module or the write access to the slave shared memory module, it becomes possible to retry the exclusive control instruction because the write access to the master shared memory module has not yet been made at this stage. As a result, it is possible to minimize the possibility of the processor module from coming to a halt by itself, thereby improving the reliability and availability of the system.

Another object of the present invention is to provide the multi-processor system described above, which further comprises fourth means for providing a flag indicative of whether or not the data in the master shared memory module are rewritten by the third means, where the flag is accessible from each of the processor modules. According to the multi-processor system of the present invention, even when an abnormality is generated during the write access to the master shared memory module, it is possible to judge whether or not the data in the master shared memory module have been rewritten by referring to the flag, and retry the exclusive control instruction if no rewriting of data has been made with respect to the master shared memory module. Hence, it is possible to further reduce the possibility of terminating the exclusive control instruction due to the abnormality, thereby further improving the reliability and availability of the system.

Other objects and further features of the present invention will be apparent from the following detailed description when read in conjunction with the accompanying drawings.

BRIEF DESCRIPTION OF THE DRAWINGS

FIG. 4 is a diagram for explaining partial shared memory spaces of a shared memory space;

FIGS. 5A and 5B are diagrams for explaining the construction of control registers which define the shared memory space;

FIG. 14 is a diagram showing a register of an execution flag related to the exclusive control instruction in a second embodiment of the multi-processor system according to the present invention;

FIG. 15 is a diagram for explaining set/reset conditions of the execution flag related to the exclusive control instruction;

DESCRIPTION OF THE PREFERRED EMBODIMENTS

Figure 1:
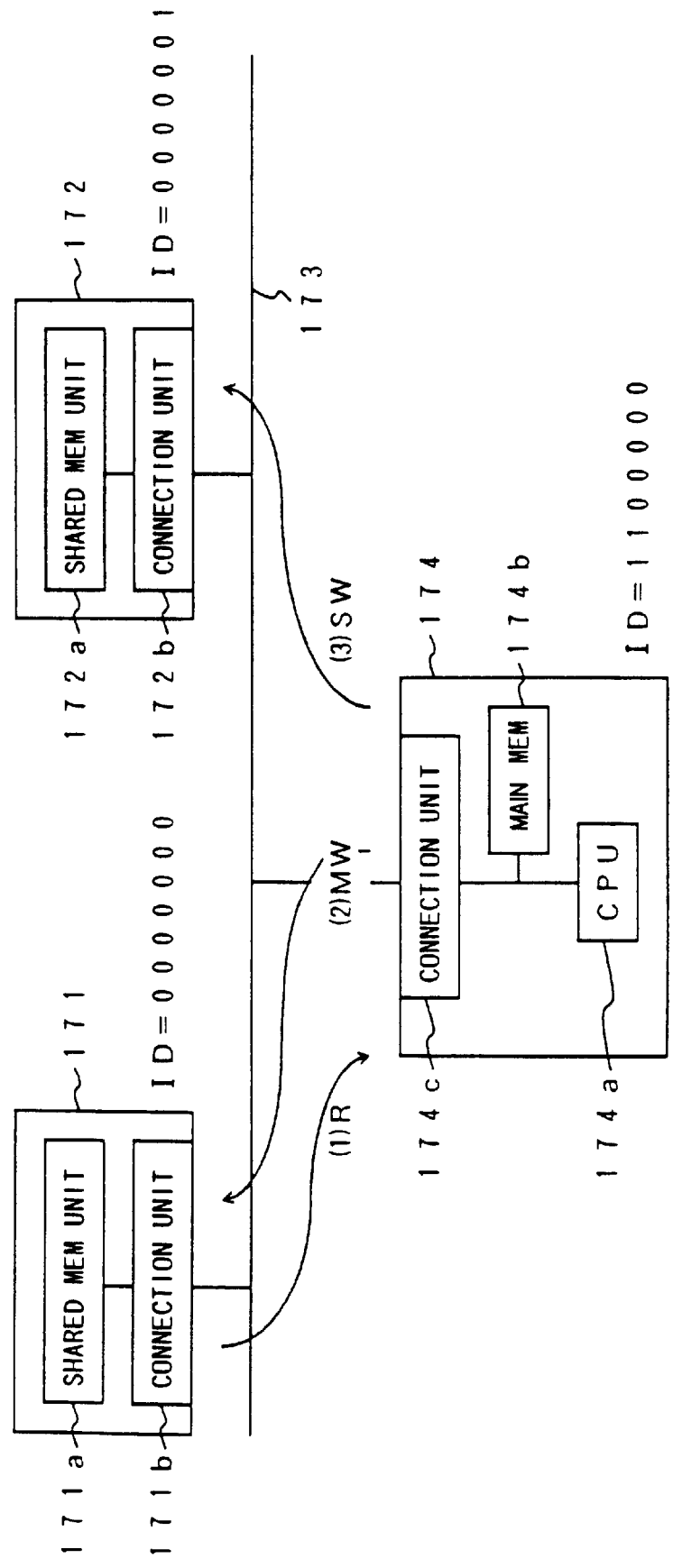
FIG. 1 is a system block diagram for explaining execution of a conventional computer system having shared memory modules with the dual construction.

First, a description will be given of the operating principle of the present invention, by referring to FIG. 2. A multi-processor system shown in FIG. 2 includes a plurality of processor modules 1 (only one shown) and a plurality of shared memory modules 2 and 2' which are coupled via a system bus 3. The processor module 1 includes a central processing unit (CPU) 1a, a main memory 1b, and a connection unit 1c. The shared memory module 2 at least includes a shared memory unit 2a and a connection unit 2b, and the shared memory module 2' at least includes a shared memory unit 2a' and a connection unit 2b'. The processor module 1 makes an access to these shared memory modules 2 and 2'. These shared memory modules 2 and 2' form a dual construction. In other words, at least a part of the plurality of shared memory modules 2 and 2' have the dual construction.

When executing an exclusive control instruction, the CPU 1a of the processor module 1 specifies an address of the arbitrary shared memory module and reads data from the specified address. If the read data and data expected by the CPU 1a match, the data at the specified address is rewritten. According to a first aspect of the present invention, when reading the data from the shared memory module 2 forming the master system out of the shared memory modules 2 and 2' and thereafter rewriting the data, the data in the other shared memory module 2' forming the slave system and forming a pair with the master shared memory module 2 are first rewritten. Then, the data in the master shared memory module 2 are rewritten. If an abnormal termination of the exclusive control instruction occurs during the write operation to the slave shared memory module 2', a write operation is not yet made to the master shared memory module 2, and thus, it is possible to retry the exclusive control instruction.

Figure 2:
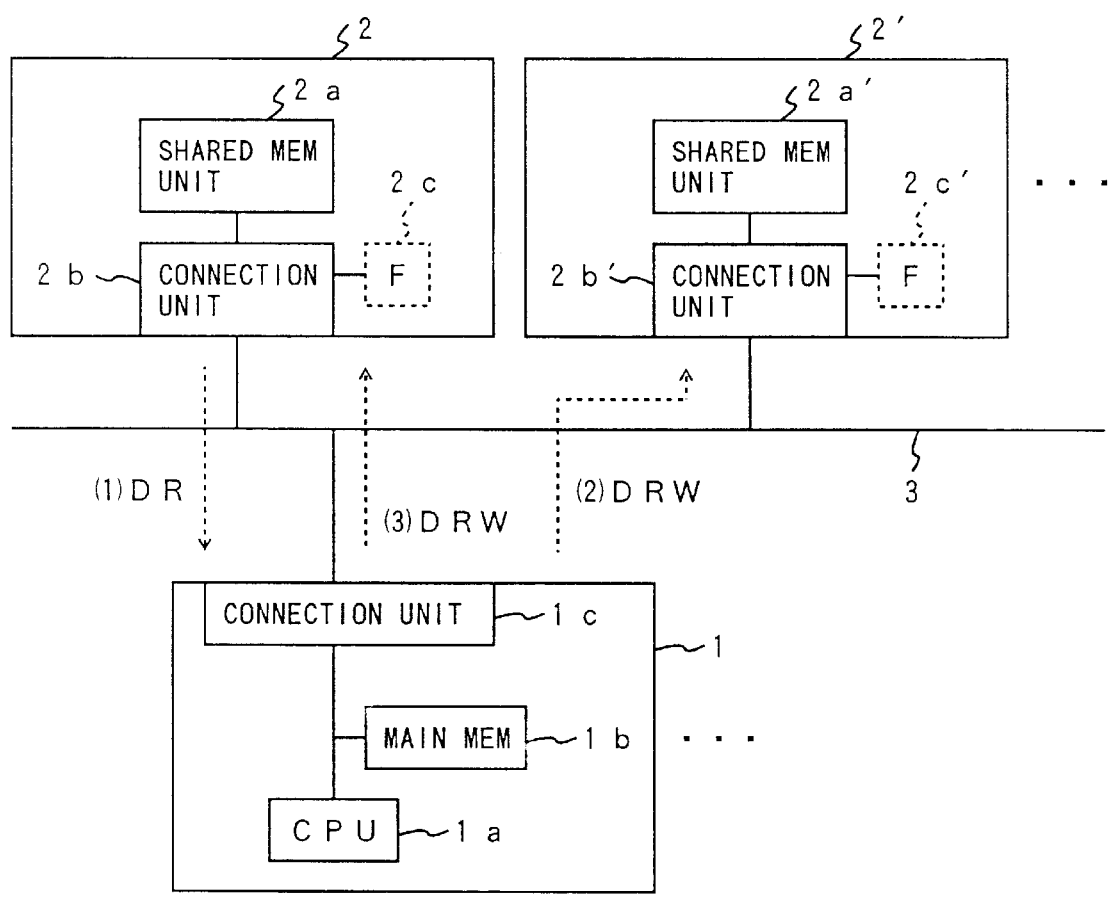
FIG. 2 is a system block diagram for explaining the operating principle of the present invention.

In FIG. 2, when the CPU 1a of the processor module 1 executes the exclusive control instruction with respect to the shared memory modules 2 and 2', the connection unit 1c makes a read access to the master shared memory module 2. The data in the exclusive control region of the master shared memory module 2 are read as indicated by "(1)DR" in FIG. 2, and a judgement is made to determine whether or not the read data and the value expected in the processor module 2 match. It is regarded that the excluksive control has failed if the read data and the expected value do not match, and the instruction is terminated so as to advance to a next instruction.

On the other hand, if the read data and the expected value match, the rewrite operation with respect to the shared memory modules 2 and 2' is started. First, a write access to the slave shared memory module 2' is made as indicated by "(2)DRW" in FIG. 2. Then, a write access is made to the master shared memory module 2 as indicated by "(3)DRW" in FIG. 2 when a normal termination of the write access to the slave shared memory module 2' is notified.

When an abnormality is detected during any of the read access to the master shared memory module 2, the write access to the slave shared memory module 2' and the write access to the master shared memory module 2, the CPU 1a checks the contents of the abnormal notification. If a result of this check reveals that no write operation is made with respect to the master shared memory module 2 and the recovery is possible, the CPU 1a continues the process by retrying the exclusive control instruction. On the other hand, if the recovery is impossible, the CPU 1a judges by itself that the operation is impossible and comes to a halt, so that a macro recovery can be made by other processor modules.

As described above, when executing an exclusive control instruction, the CPU 1a of the processor module 1 specifies an address of the arbitrary shared memory module and reads data from the specified address. If the read data and data expected by the CPU 1a match, the data at the specified address is rewritten. According to a second aspect of the present invention, when reading the data from the shared memory module 2 forming the master system out of the shared memory modules 2 and 2' and thereafter rewriting the data, the data in the other shared memory module 2' forming the slave system and forming a pair with the master shared memory module 2 are first rewritten. Then, the data in the master shared memory module 2 are rewritten. If an abnormal termination of the exclusive control instruction occurs, a judgement is made to determine whether or not the data in the master shared memory module 2 have been rewritten, so as to retry the exclusive control instruction based on the judgement.

In this case, a flag 2c may be provided in the master shared memory module 2, and a flag 2c' may be provided in the slave memory module 2'. The flags 2c and 2c' are set by the corresponding read operation of the exclusive control instruction, and are reset when the corresponding write operation of the exclusive control instruction is normally carried out. The flags 2c and 2c' can be read from each processor module 1. Hence, when the abnormal termination of the exclusive control instruction occors, the CPU 1a of the processor module 1 which executes the exclusive control instruction judges whether or not the data in the master shared memory module 2 has been rewritten by referring to the flag 2c.

Therefore, according to the first and second aspects of the present invention, when executing the exclusive control instruction with respect to the shared memory modules 2 and 2' forming the duplex construction, the write access is first made to the slave shared memory module 2', and the write access to the then made to the master shared memory module 2. As a result, even if the abnormal termination of the exclusive control instruction occurs during the read operation to the master or slave shared memory modules 2 or 2' or the write operation to the slave shared memory module 2' due to an intermittent (or occasional) failure or the like, no rewriting has yet been made with respect to the master shared memory module 2 in this stage, and the retry of the exclusive control instruction is possible. Accordingly, it is possible to reduce the case where the processor module 1 must come to a halt by itself, and to improve the availability of the system.

Furthermore, when the flags 2c and 2c' are provided, the processor module 1 can easily judge whether or not the data in the master shared memory module 2 have been rewritten by referring to the flag 2c even if the abnormality occurs during the write operation to the master shared memory module 2. It is therefore possible to positively increases the cases where the exclusive control instruction can be retried.

Next, a description will be given of a first embodiment of a multi-processor system according to the present invention.

Figure 3:
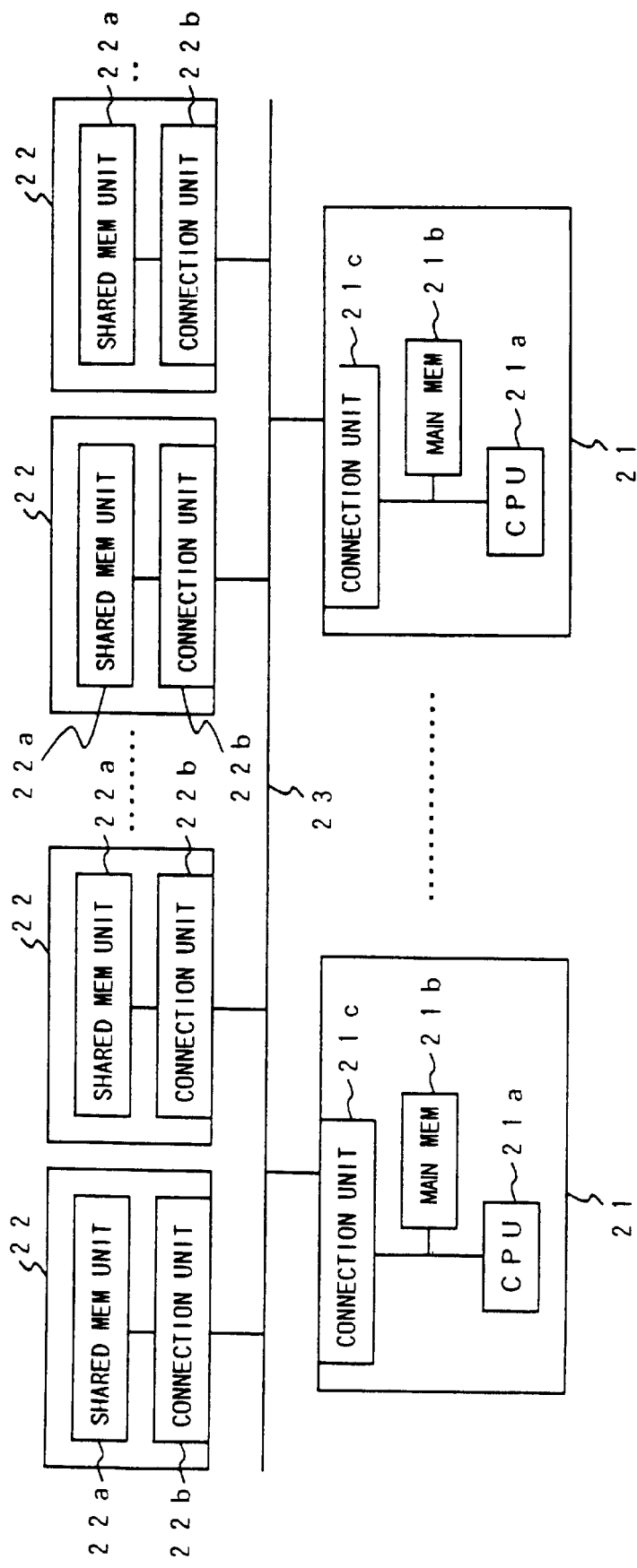
FIG. 3 is a system block diagram showing a first embodiment of a multi-processor system according to the present invention.

FIG. 3 generally shows the first embodiment. A multi-processor system shown in FIG. 3 includes a plurality of processor modules 21 (only two shown) and a plurality of shared memory modules 22 (only four shown) which are coupled via a system bus 23.

In FIG. 3, each processor module 21 at least includes a CPU 21a, a main memory 21b and a bus connection unit 21c which connects to the system bus 23. Each processor module 21 carries out processes by executing programs within the main memory 21b thereof. The multi-processor system has a high processing capability because the plurality of processing modules 21 carry out the processes in parallel.

On the other hand, each shared memory module 22 at least includes a shared memory unit 22a and a bus connection unit 22b which connects to the system bus 23. An access can be made to each of the shared memory modules 22 from any of the processor modules 21.

FIG. 4 shows a shared memory space to which an access can be made from the CPU 21a of the processor module 21 shown in FIG. 3. In this embodiment, the shared memory space is divided into four partial shared memory spaces #0 through #3, and it will be assumed for the sake of convenience that four shared memory modules 22 are provided.

As shown in FIG. 4, the shared memory modules 22 having the unit identifications (IDs) ID=0000000 and ID=0000001 are defined in the partial shared memory space #0 as a dual pair. "Not mounted" is defined in the partial shared memory space "1. The shared memory module 22 having the unit ID ID=0000010 is defined in the partial shared memory space #2 as a single, and the shared memory module 22 having the unit ID ID=0000011 is defined in the partial shared memory space #3 as a single.

The shared memory space shown in FIG. 4 can be realized when the CPU 21a of the processor module 21 sets this shared memory space in control registers provided in the bus connection unit 21c of the processor module 21.

Figures 5A, 5B:
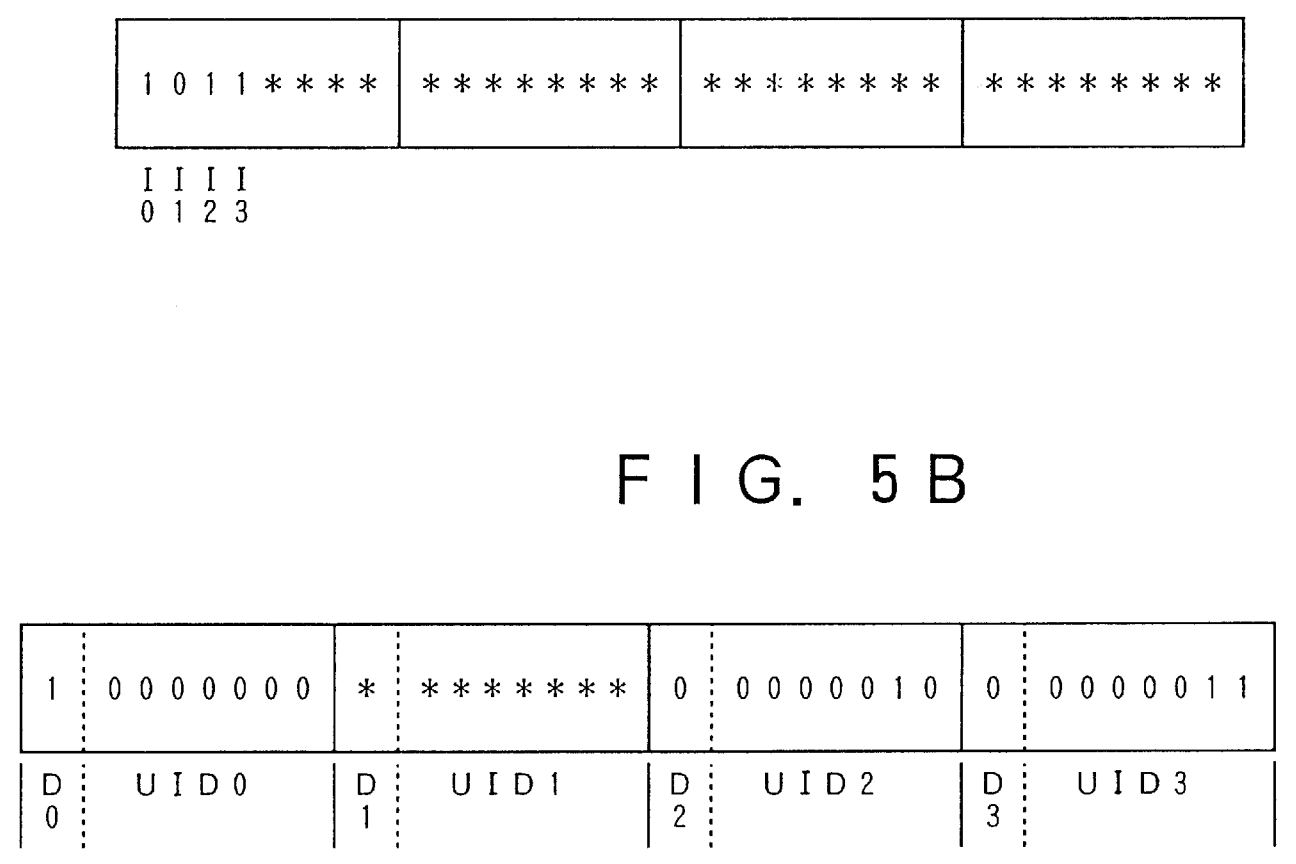

FIGS. 5A and 5B show the construction of the control registers defining the shared memory space described above. FIG. 5A shows the construction of the control registers which specify the existence of the shared memory modules 22 with respect to the four partial shared memory spaces #0 through #3. FIG. 5B shows the control registers which define the link of the spaces defined by the control registers shown in FIG. 5A and the shared memory modules 22.

In FIG. 5A, "I0 (Install 0)" written vertically indicates the existence of the shared memory module 22 with respect to the partial shared memory space #0. Similarly, "I1 (Install 1)" written vertically indicates the existence of the shared memory module 22 with respect to the partial shared memory space #1, "I2 (Install 2)" written vertically indicates the existence of the shared memory module 22 with respect to the partial shared memory space #2, and "I3 (Install 3)" written vertically indicates the existence of the shared memory module 22 with respect to the partial shared memory space #3. "1" is set for the space for which the shared memory module 22 exists, and "0" is set for the space for which the shared memory module 22 does not exist.

In this case, only the partial shared memory space #1 is not mounted, and the other partial shared memory spaces are loaded. For this reason, [1011] is set in the control register as shown. A symbol "*" denote a don't care.

In FIG. 5B, D0 written vertically indicates the dual construction of the shared memory module 22 with respect to the partial shared memory space #0, and D1 written vertically indicates the dual construction of the shared memory module 22 with respect to the partial shared memory space #1. In addition, D2 written vertically indicates the dual construction of the shared memory module 22 with respect to the partial shared memory space #2, and D3 written vertically indicates the dual construction of the shared memory module 22 with respect to the partial shared memory space #3. Further, the unit IDs of the shared memory modules 22 on the system bus 23 with respect to the partial shared memory spaces #0 through #3 are specified in unit IDs UID0 through UID3. In the dual construction, the shared memory modules 22 forming the dual construction have the same unit IDs UID except for the least significant bits (LSBs) which differ.

In this particular case, the partial shared memory space #0 is defined by the dual construction of the shared memory modules 22. For this definition, the bit D0 is set to "1" and the field of the unit ID UID0 is set to "0000000". Hence, the bus connection unit 21c of the processor module 21 can recognize the duplex construction of the space by referring to the bit D0.

In addition, in this particular case, the unit IDs UID of the pair of shared memory modules 22 forming the duplex construction must be specified by the same unit ID UID expect for the LSB. Hence, the shared memory modules 22 having the unit IDs ID=0000000 and ID=0000001 are allocated as the pair forming the dual construction.

Figure 6:
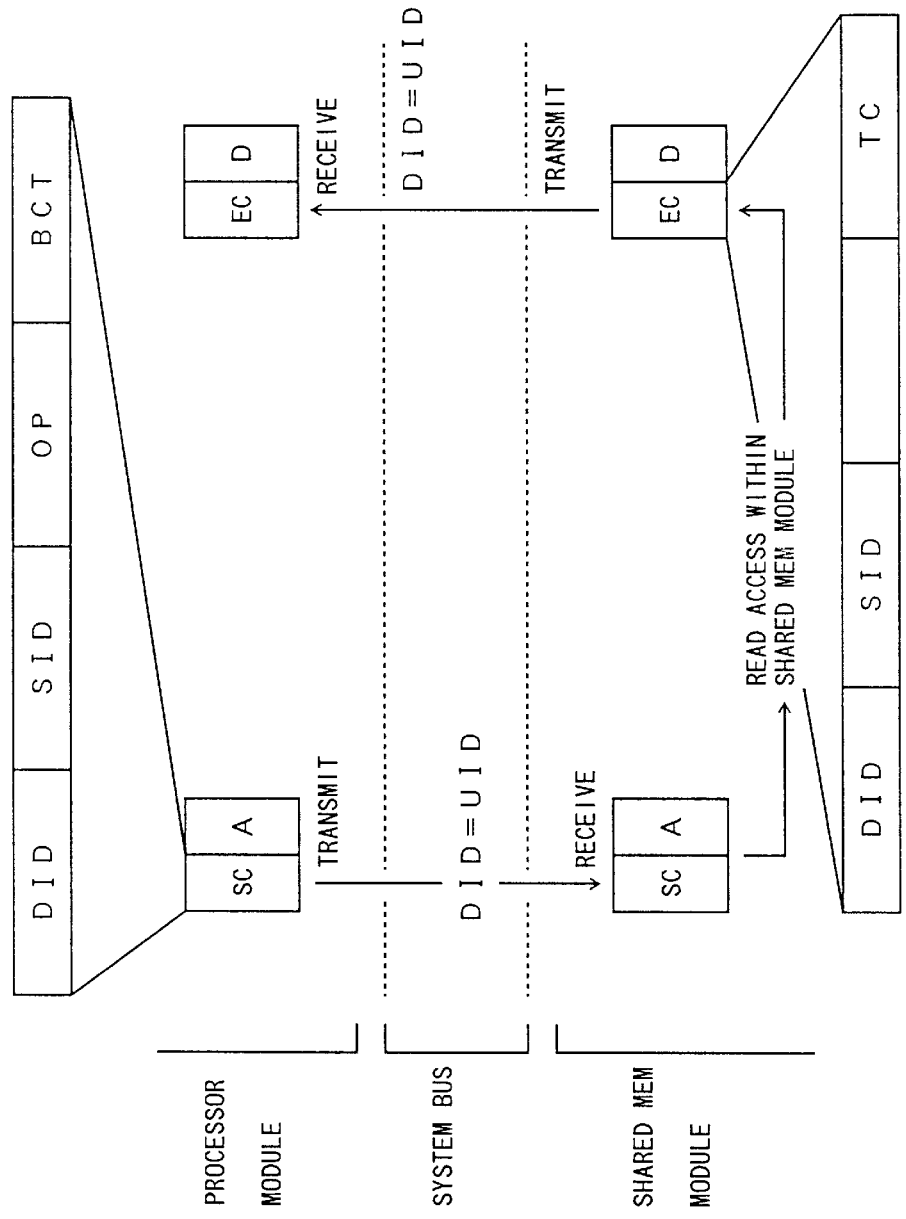
FIG. 6 is a diagram for explaining a read operation when making access to the shared memory space.

FIG. 6 is a diagram for explaining the read operation when the processor module 21 makes an access to the shared memory module 22. In FIG. 6, SC denotes a transfer command (or a send command), EC denotes a response command (or an end command), A denotes an address, and D denotes data. The transfer command SC includes a destination ID DID which indicates the unit ID of the destination, a self ID SID which indicates the unit ID of itself as the source, an operand OP which indicates information such as read/write, and a byte count BCT which indicates the length of the transfer data. In addition, the response command EC includes a field DID which indicates the source unit ID SID received by the transfer command SC as the destination, a field SID which indicates the unit ID UID of the shared memory module 22 itself as the source, and a termination code TC which indicates whether or not the access was successful.

In FIG. 6, when the CPU 21a of the processor module 21 makes access to the memory space, the bus connection unit 21c sends the transfer command SC and the address A to the system bus 23.

As described above, the transfer command SC includes the destination ID DID which indicates the unit ID of the destination, the self ID SID which indicates the unit ID of itself, the operand OP which indicates information such as read/write, and a byte count BCT which indicates the length of the transfer data. The destination ID DID which indicates the unit ID of the destination is added by the bus connection unit 21c based on the contents of the control registers shown in FIGS. 5A and 5B.

The transfer command SC sent to the system bus 23 is received by all of the shared memory modules 22, but is only accepted and entered by the shared memory module 22 having a matching field DID. The shared memory module 22 which accepts and enters the transfer command SC extracts the read/write information, the byte count BCT and the address from the transfer command SC, and an access is made to the shared memory unit 22a thereof.

In the case of the read operation shown in FIG. 6, the shared memory module 22 sends to the system bus 23 the read data and the response command EC which includes the termination code TC indicative of whether or not the access was successful. In the response command EC, the self ID SID indicating the unit ID of itself is set in the field DID, and the unit ID of the shared memory module 22 is set is the field SID.

Therefore, although the sent response command EC is received by all of the processor modules 21, only the processor module 21 having the matching field DID accepts and enters the response command EC.

Figure 7:
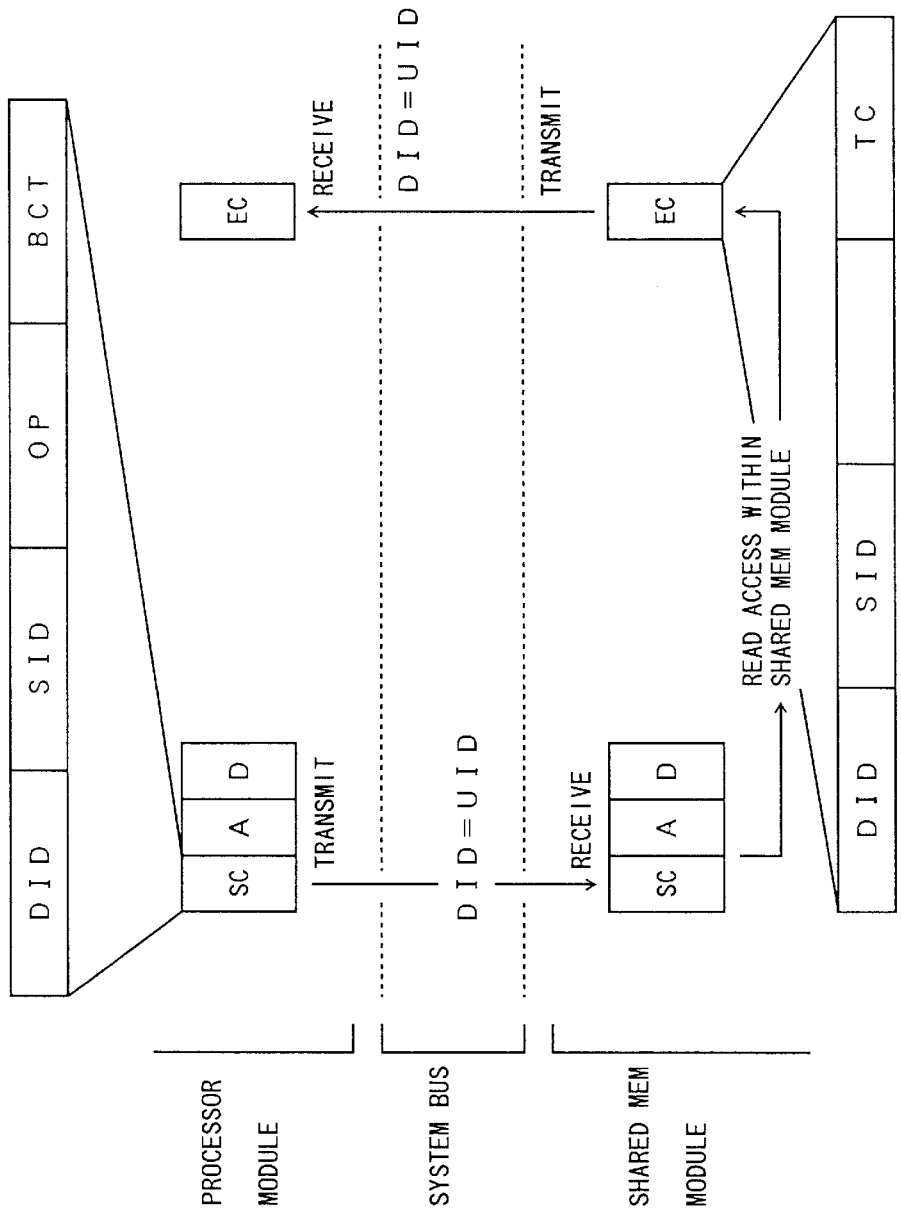
FIG. 7 is a diagram for explaining a write operation when making access to the shared memory space.

FIG. 7 is a diagram for explaining the write operation when the processor module 21 makes an access to the shared memory module 22 to write one word of data. In FIG. 7, SC denotes a transfer command (or a send command), EC denotes a response command (or an end command), A denotes an address, and D denotes data, similarly as in the case of FIG. 6 described above. In addition, the transfer command SC includes a destination ID DID, a self ID SID and a termination code TC.

When writing the data from the processor module 21 to the shared memory module 22, the transfer command SC, the address A and the data D are sent to the shared memory module 22 via the system bus 23. The shared memory module 22 writes the received data D into the shared memory unit 22a thereof, and sends to the processor module 21 the response command EC which includes the fields DID and SID and the termination code TC to the processor module 21 via the system bus 23.

Figure 8:
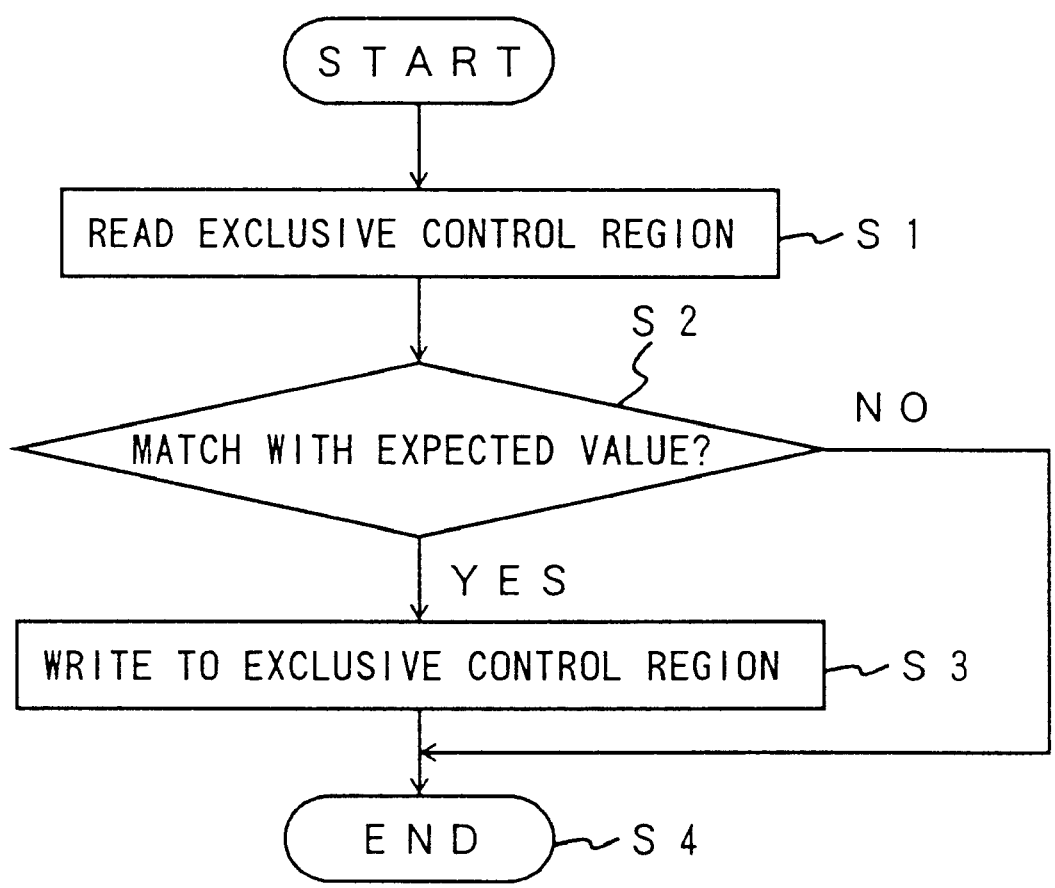
FIG. 8 is a flow chart for explaining an exclusive control instruction of the first embodiment.

FIG. 8 is a flow chart for explaining the operation of executing the exclusive control instruction. In FIG. 8, a step S1 reads the data in the exclusive control region of the shared memory module 22 by making a read access, and a step S2 decides whether or not the read data matches the expected value. If the decision result in the step S2 is NO, it is regarded that the exclusive control has failed, and the instruction is terminated. On the other hand, if the decision result in the step S2 is YES, a step S3 rewrites the exclusive control region by making a write access. As a result, the processor module 21 acquires the right of exclusive control with respect to the shared memory modules 22.

When executing the exclusive control instruction as described above, the read access and the write access are made in one instruction. However, when the shared memory space has the dual construction, the bus connection unit 21c of the processor module 21 carries out the write operation with respect to the master and slave shared memory modules 22.

If an abnormality is generated during the series of processes described above, the bus connection unit 21c interrupts the process and makes an exception notification of the bus access with respect to the CPU 21a.

A description will now be given of the operation of the CPU 21a when such an exception is generated.

The CPU 21a successively executes the processing programs stored in the main memory 21b. However, the processing is interrupted and the process shifts to a processing routine which is prepared in advance if an exception generated makes access to a region outside the mount region of the main memory 21b, an interrupt is generated at predetermined intervals by a timer or, an interrupt is generated by a trap instruction. The exception, interrupt and trap described above will hereinafter be referred to as EIT processes.

Figure 9:
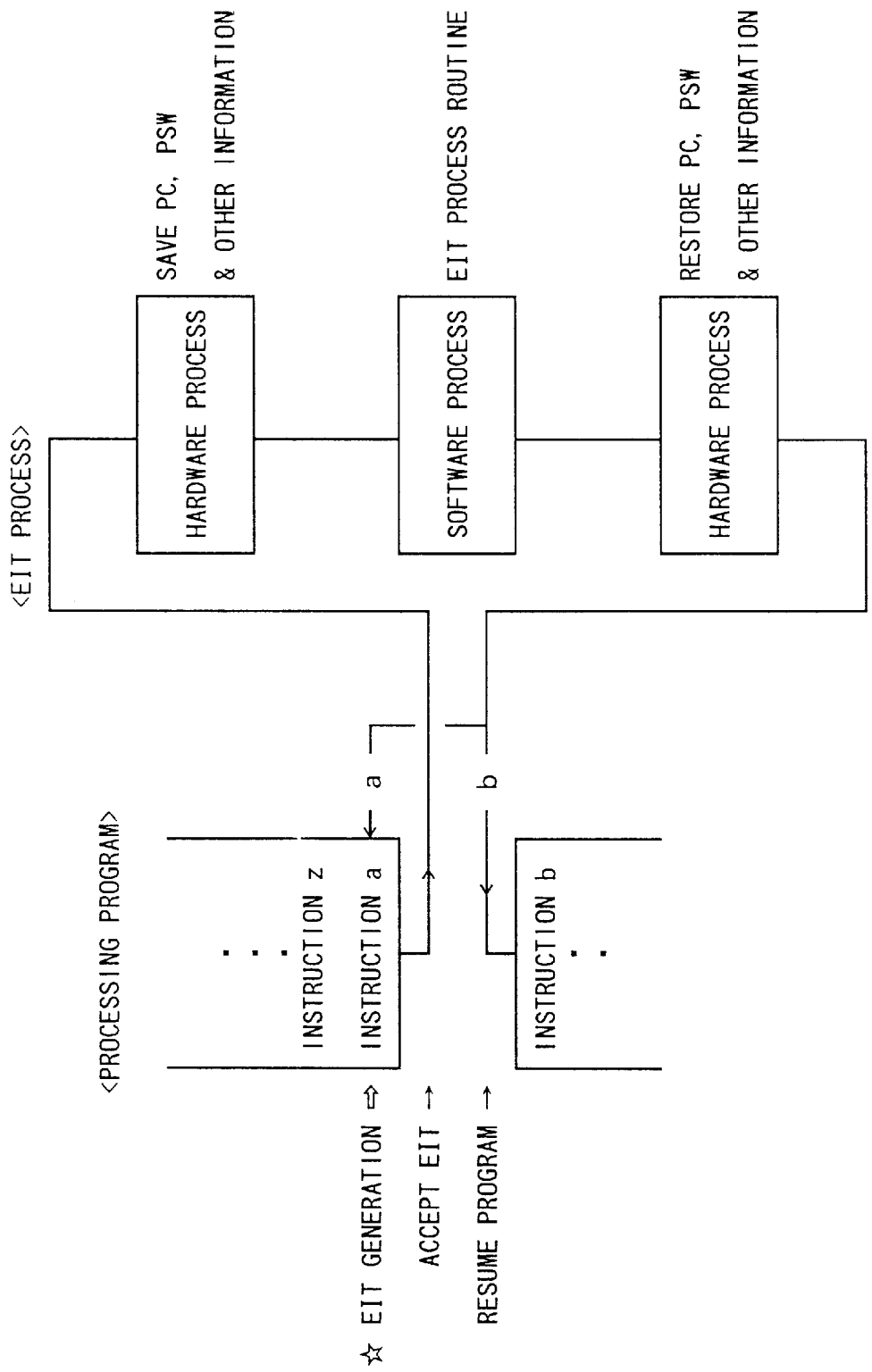
FIG. 9 is a diagram for explaining an EIT process of a CPU.

FIG. 9 is a diagram for explaining the EIT process of the CPU 21a. For the sake of convenience, it will be assumed in FIG. 9 that a bus access exception is notified from the bus connection unit 21c during execution of the processing program by the CPU 21a.

In FIG. 9, when the EIT is generated during execution of the processing program and the CPU 21a receives the EIT, the CPU 21a saves in the main memory 21b information which is required when returning to the processing program and information which is required in the EIT processing routine by a hardware process shown in FIG. 9. The information which is required when returning to the processing program includes a program counter PC, a processor status word PWS and the like. The information which is required in the EIT processing routine includes information indicating what kind of a phenomenon is generated and the like. Then, a predetermined EIT processing routine is carried out. When the software process of the EIT processing routine ends, a hardware process is carried out to restore the saved information, and the process returns again to the processing program.

In addition, when returning to the processing program, there is a case where the same instruction is executed again as indicated by "a" in FIG. 9, and a case where the process advances to the next instruction as indicated by "b" in FIG. 9. The return us made as indicated by "a" in the case of the EIT process of the exception, and the return is made as indicated by "b" in the case of the EIT process of the trap. In other words, the return is made as indicated by "a" in the case of the exception of the exclusive control instruction.

Figure 10:
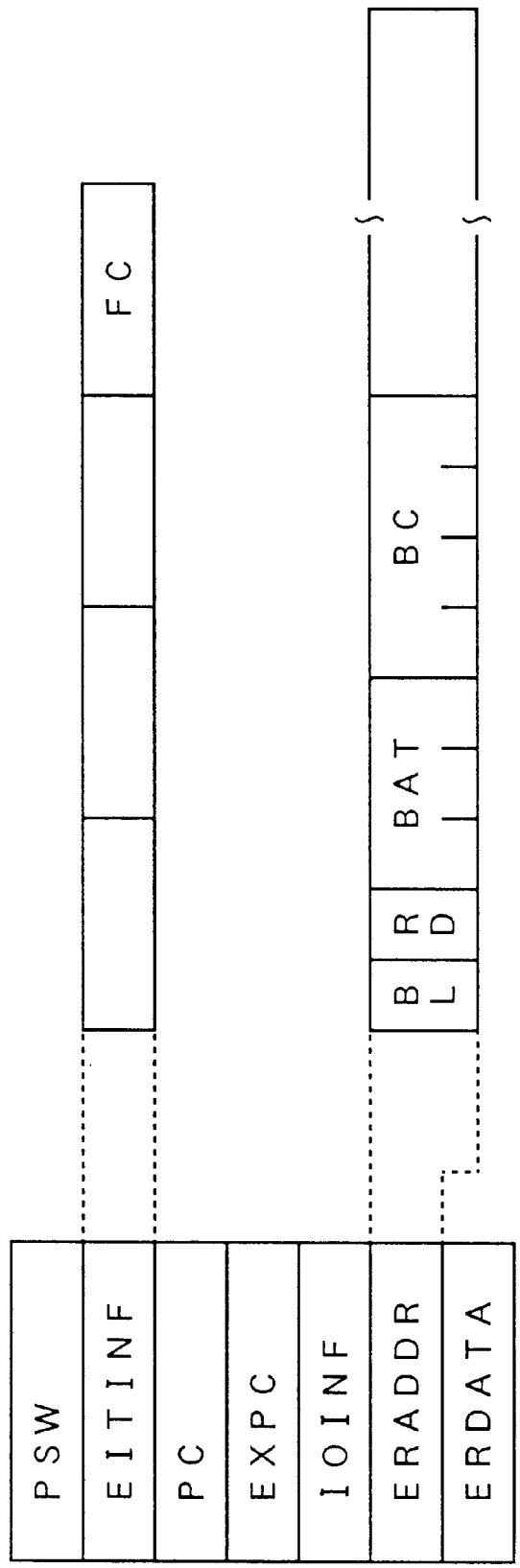
FIG. 10 is a diagram for explaining save/restore information related to the EIT process.

FIG. 10 shows information that is saved by the hardware at the start of the EIT process. In FIG. 10, PSW denotes a process status word which is set in a register which controls the operation of the processor and indicates the operating state, and EITINF denotes EIT information including a primary factor code FC indicated by the EIT information. The primary factor code FC includes the various exception factors and interrupt factors described above or, the trap factor, in a coded form.

In addition, in FIG. 10, PC denotes a program address which is used when returning from the EIT process, and EXPC denotes a program address which generated the EIT factor. IOINF denotes detailed information related to the bus access which generated the EIT factor, and IOINF denotes information including BL, RD, BAT, BC and the like. BL denotes a bus lock which indicates that the instruction being executed is an exclusive control instruction, RD indicates whether the access is a read or write (read/write), BAT indicates a bus access type, and BC denotes a byte control. The bus access type BAT indicates whether the operation is a program read or an operand access (read/write). The byte control BC indicates whether each byte on the 4-byte data bus is valid or invalid. Furthermore, ERADDR denotes an address which generated the exception, and ERDATA denotes the data at the time when the exception was generated and is valid during the write operation, that is, when the bit RD is "0".

Figure 11:
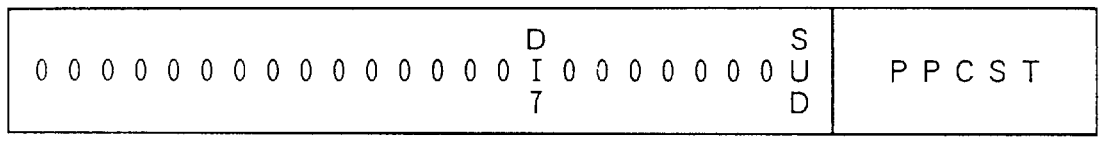
FIG. 11 is a diagram showing a register which indicates an access completion code.

FIG. 11 is a diagram for explaining an access completion code. A termination code (or program port complete status) PPCST of the shared memory access shown in FIG. 11 is stored in a register of the bus connection unit 21c of the processor module 21. A bit (or SSM undefined) SUD indicated vertically in FIG. 11 is set when an access is made to the address space which is defined as being not mounted in FIGS. 5A and 5B. When the access is made to the address space which is defined as being not mounted and the bit SUD is set, the bus connection unit 21c merely notifies the exception. In this case, the termination code PPCST of course does not have a meaning.

In FIG. 11, DI7 (DID-BIT7) written vertically indicates the LSB of the unit ID UID which indicates the unit ID of the shared memory module 22 to which the access was made when the exception was generated. Since the unit ID UID of the shared memory module 22 and the single/dual construction are defined for each access space address, it is possible to easily check the shared memory module 22 to which the access is made when the exception is generated by checking the LSB DI7.

Figure 12:
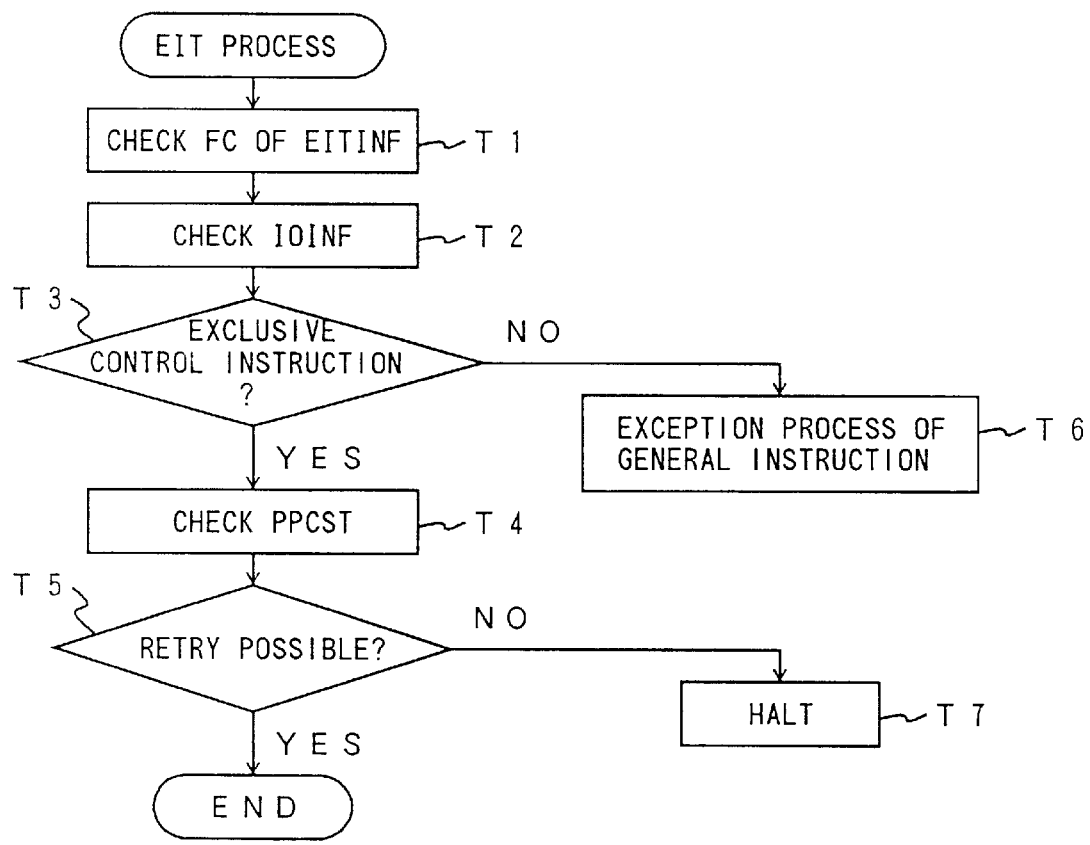
FIG. 12 is a flow chart for explaining the EIT process related to the exclusive control instruction.

FIG. 12 is a flow chart generating showing the EIT process routine.

When the EIT process routine shown in FIG. 12 is started, a step T1 checks the primary factor code FC of the EIT information EITINF shown in FIG. 10 and recognizes the primary factor. A step T2 checks the bus lock bit BL of the detailed information IOINF, and a step T3 decides whether or not it is an exception of the exclusive control instruction being executed.

If the decision result in the step T3 is NO, a step T6 carries out the exception process of the general instruction. On the other hand, if the decision result in the step T3 is YES, a step T4 checks the termination code PPCST, and a step T5 decides whether or not the exclusive control instruction can be retried based on the contents of the termination code PPCST.

If the decision result in the step T5 is NO, a step T7 halts the processor module 21 by itself. On the other hand, if the decision result in the step T5 is YES, the EIT process ends because it is judged that the exclusive control instruction can be retried.

In the case of the EIT process of the exception, the program address PC in the saved information at the time of the returning is set the same as the program address EXPC which generated the EIT factor. Hence, by ending the EIT process, it becomes possible to retry the instruction which is the same as the instruction before entering the EIT process.

Whether or not the instruction can be retried in the EIT process, depends on whether or not the data in the master shared memory module 22 from which the data are read are rewritten by the access generated by the exception. If the data in the master shared memory module 22 are not rewritten, it is essentially the same as if the instruction has not yet been executed.

Accordingly, it is possible to increase the possibility of enabling the exclusive control instruction to be retried by minimizing the generation of the exception accompanying the rewriting the master shared memory module 22.

Next, a description will be given of the operation of the first embodiment, by referring to FIG. 13. As described above, this embodiment takes measures so that the generation of the exception accompanying the rewriting of data in the master shared memory module is minimized.

FIG. 14 generally shows the first embodiment. A multi-processor system shown in FIG. 14 includes a plurality of processor modules 124 (only two shown) and a plurality of shared memory modules 121 and 122 (only two shown) which are coupled via a system bus 123. The processor module 124 corresponds to one of the processor modules 21 shown in FIG. 3. In addition, the shared memory module 121 corresponds to one of the shared memory modules 22 shown in FIG. 3, and the shared memory module 122 corresponds to another of the shared memory modules 22 shown in FIG. 3.

In FIG. 14, each processor module 124 at least includes a CPU 124a, a main memory 124b and a bus connection unit 124c which connects to the system bus 123. Each processor module 124 carries out processes by executing programs within the main memory 124b thereof. The multi-processor system has a high processing capability because the plurality of processing modules 124 carry out the processes in parallel.

On the other hand, the shared memory module 121 at least includes a shared memory unit 121a and a bus connection unit 121b which connects to the system bus 123, and the shared memory module 122 at least includes a shared memory unit 122a and a bus connection unit 122b which connects to the system bus 123. An access can be made to each of the shared memory modules 121 and 122 from any of the processor modules 124.

Similarly to the conventional system shown in FIG. 1, the unit ID of the shared memory module 121 is ID=0000000, the unit ID of the shared memory module 122 is ID=0000001, and the unit ID of the processor module 124 is ID=1100000.

Figure 13:
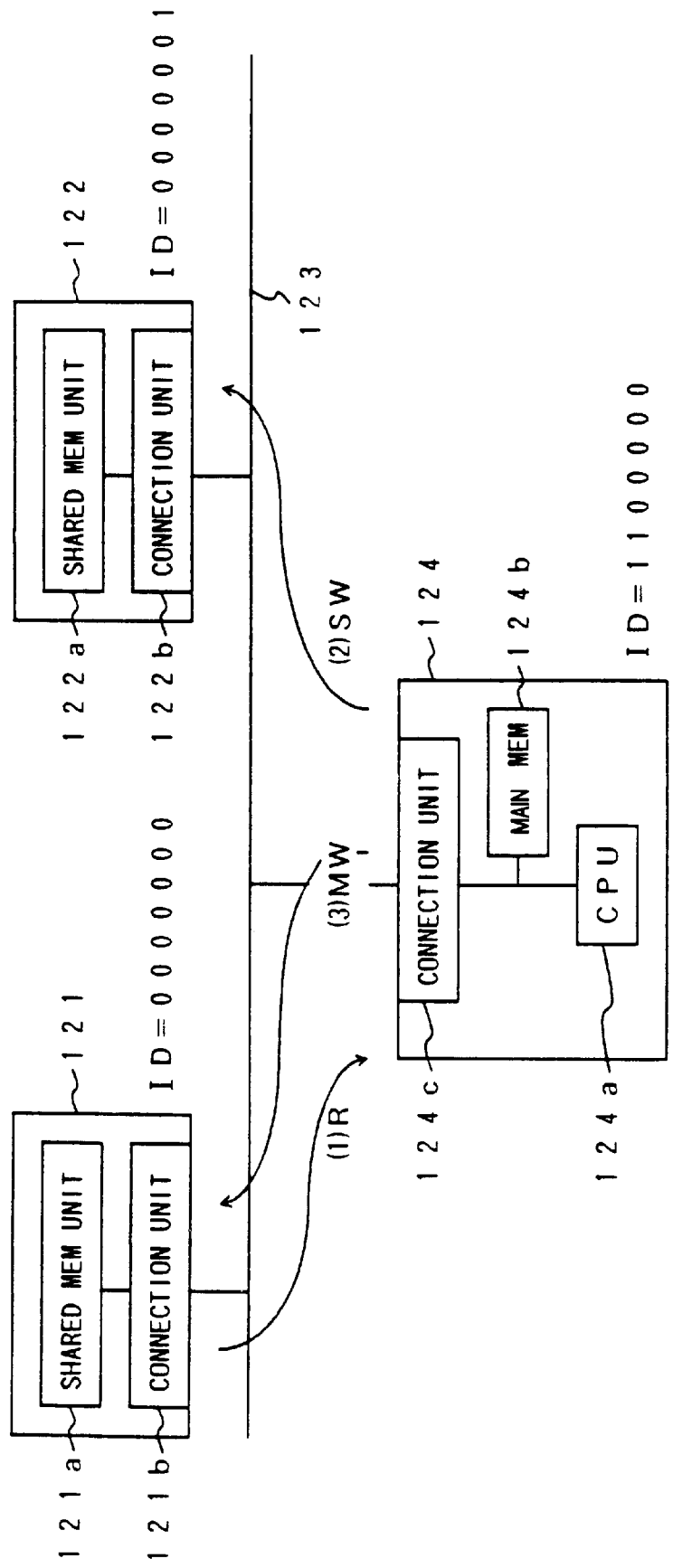
FIG. 13 is a system block diagram for explaining the operation of the first embodiment.

In FIG. 13, when the CPU 124a of the processor module 124 executes the exclusive control instruction, the read operation from the shared memory module is recognized by the bus connection unit 124c. The bus connection unit 124c makes a read access to the master shared memory module 121 having the unit ID ID=0000000. Then, the data in the exclusive control region of the master shared memory module 121 are read by a read access indicated by "(1)R" in FIG. 13. A judgement is made to determine whether the read data and the expected value expected in the processor module 124 match. If the read data and the expected value do not match, it is regarded that the exclusive control has failed, and the instruction is terminated and the process advances to the next instruction.

On the other hand, if the read data and the expected value match, the operation of rewriting the data in the shared memory modules 121 and 122 is started. In this case, the order in which the rewriting operation is carried out is reversed from that of the conventional system shown in FIG. 1, and the rewriting operation is first carried out with respect to the slave shared memory module 122.

In other words, when the bus connection unit 124c recognizes the rewriting operation, a write access is made to the slave shared memory module 122 having the unit ID ID=0000001 as indicated by "(2)SW" in FIG. 13. After receiving a notification indicating the normal termination, the bus connection unit 124c then makes a write access to the master shared memory module 121 having the unit ID ID=0000000 as indicated by "(3)MW" in FIG. 13. After receiving a notification indicating the completion of the write to the master shared memory module 121, the bus connection unit 124c notifies the completion to the CPU 124a, and the exclusive control instruction is terminated.

The bus connection unit 124c makes an abnormality notification to the CPU 124a in synchronism with the exclusive control instruction when an abnormality is detected during the read access to either the master or slave shared memory module 121 or 122, the write access to the master shared memory module 121, and the write access to the slave shared memory module 122. In response to this abnormality notification, the CPU 124a checks the contents of the abnormality notification, similarly as in the case of the conventional system shown in FIG. 1, and the process is continued by retrying (or re-executing) the exclusive control instruction if a recovery is possible. But if the recovery is impossible, the CPU 124a judges by itself that the operation is impossible and comes to a halt, so as to make a macro recovery using other processor modules.

As described above, this embodiment carries out the rewrite operation first with respect to the slave shared memory module 122. For this reason, even if an abnormality occurs in the slave shared memory module 122 during the write access due to the intermittent failure or the like of the system, the rewrite operation is not yet carried out with respect to the master shared memory module 121 at this stage, and it is therefore possible to retry the exclusive control instruction.

Next, a description will be given of a second embodiment of the multi-processor system according to the present invention, by referring to FIGS. 14 and 15. In this embodiment, an execution flag is additionally provided in the first embodiment so as to indicate whether or not the exclusive control instruction has been executed. The execution state of the exclusive control instruction can be judged by making a reference to the execution flag, and it is possible to judge whether or not the exclusive control instruction can be retried depending on the execution state.

FIG. 14 is a diagram for explaining a register for defining the execution flag related to the exclusive control instruction. As shown in FIG. 14, the execution flags related to the exclusive control instructions of processor modules PM0 through PM31 having the unit IDs ID=1100000 through ID=1111111 are independently defined in this register. These flags are provided within each of the shared memory modules, and an access can be made to the flags from each of the processor modules PM0 through PM31.

FIG. 15 is a diagram for explaining set/reset conditions of the execution flag related to the exclusive control instruction. As shown in FIG. 15, the execution flag is set by a read process of the exclusive control instruction as indicated by [1] in FIG. 15, and is reset by the normal termination of a write process of the exclusive control instruction as indicated by [2] in FIG. 15. The execution flag is set/reset by each shared memory module with respect to each of the processor modules by referring to the field SID shown in FIGS. 6 and 7.

Figure 16:
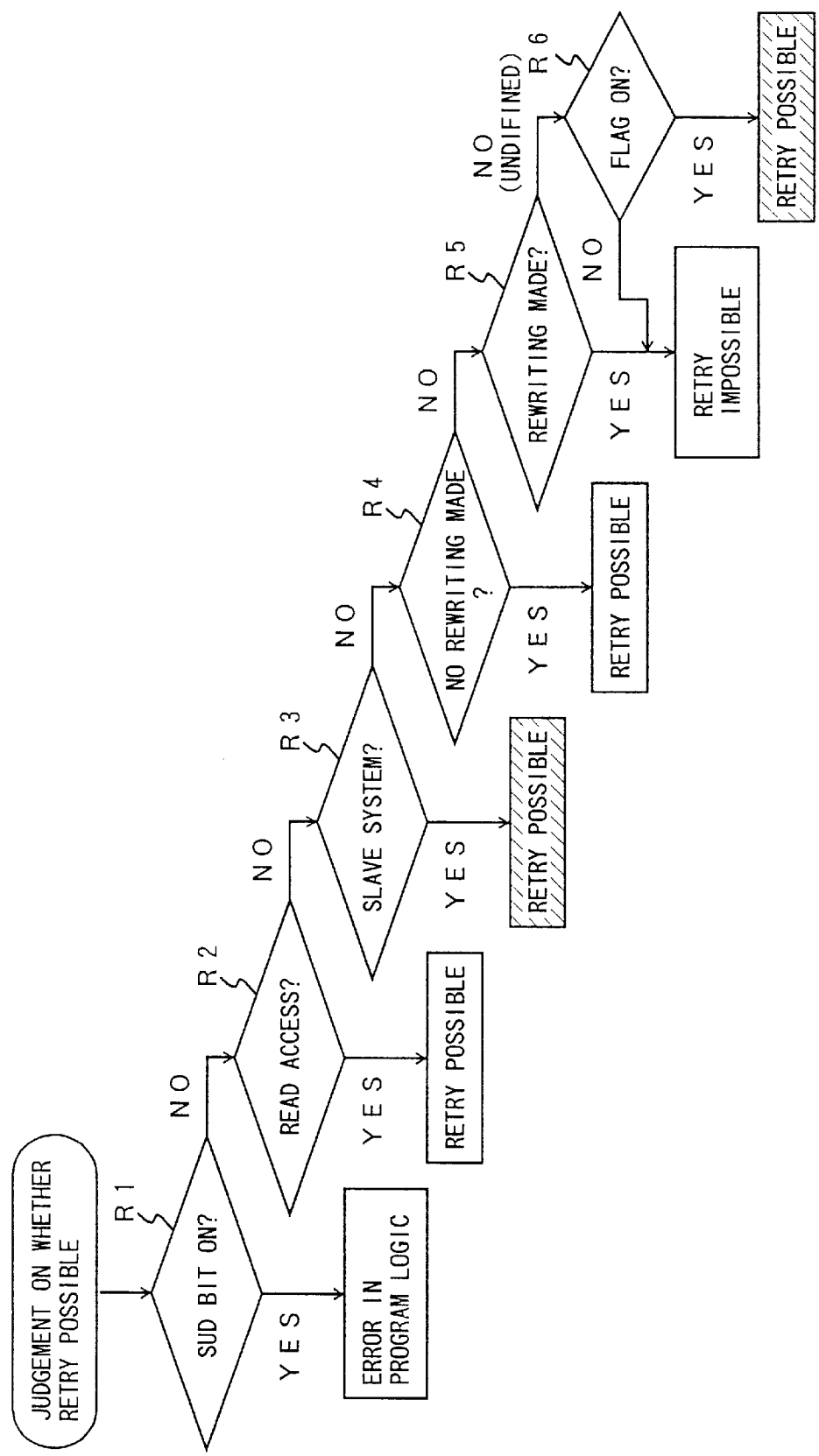
FIG. 16 is a flow chart for explaining the process of deciding whether or not a retry is possible in the second embodiment.

Next, a description will be given of the process of judging whether or not the retry of the exclusive control instruction is possible in the recovery process of the second embodiment when an abnormality is generated during execution of the exclusive control instruction, by referring to FIG. 16. FIG. 16 is a flow chart for explaining the process of deciding whether or not the retry is possible in the second embodiment.

In the process of judging whether or not the retry of the exclusive control instruction is possible shown in FIG. 16, a step R1 refers to the bit SUD shown in FIG. 11 which is set when an access is made to the address space which is defined as being not mounted, and decides whether or not the bit SUD is ON. If the decision result in the step R1 is YES, it is judged that there is an error in the program logic. On the other hand, if the decision result in the step R1 is NO, a step R2 decides whether or not the access is a read access. More particularly, the step R2 refers to the bit RD indicative of the read/write in the detailed information IOINF shown in FIG. 10, and decides whether or not an abnormality is generated during the read operation. If the abnormality is generated during the read operation and the decision result in the step R2 is YES, no rewriting has yet been carried out with respect to the shared memory module, and it is judged that the retry of the exclusive control instruction is possible.

On the other hand, if the abnormality is not generated during the read operation and the decision result in the step R2 is NO, a step R3 refers to the LSB DI7 shown in FIG. 11 of the unit ID UID which indicates the shared memory module to which the access is made when the exception is generated during the access, and decides whether or not the slave system shared memory module is indicated. If the decision result in the step R3 is YES, no rewriting has been made with respect to the master shared memory module, and it is judged that the retry of the exclusive control instruction is possible.

If the decision result in the step R3 is NO, a step R4 refers to the contents of the termination code PPCST shown in FIG. 11 of the shared memory module, and decides whether or not it can be guaranteed that the rewriting of the master shared memory module has not been made. If the decision result in the step R4 is YES, it is judged that the retry of the exclusive control instruction is possible.

On the other hand, if the decision result in the step R4 is NO, a step R5 refers to the contents of the termination code PPCST of the shared memory module, and decides whether or not the rewriting of the master shared memory module is clearly indicated. If the decision result i the step R5 is YES, it is judged that the retry of the exclusive control instruction is impossible.

If the decision result in the step R5 is NO and it cannot be guaranteed that no rewriting of the master shared memory module has been made, a step R6 decides whether or not the execution flag is ON (or is set). If the decision result in the step R6 is YES, the rewriting of the master shared memory module has not yet been made, and it is judged that the retry of the exclusive control instruction is possible. On the other hand, if the decision result in the step R6 is NO, it is regarded that the rewriting has been made with respect to the master shared memory module, and it is judged that the retry of the exclusive control instruction is impossible.

Figure 17:
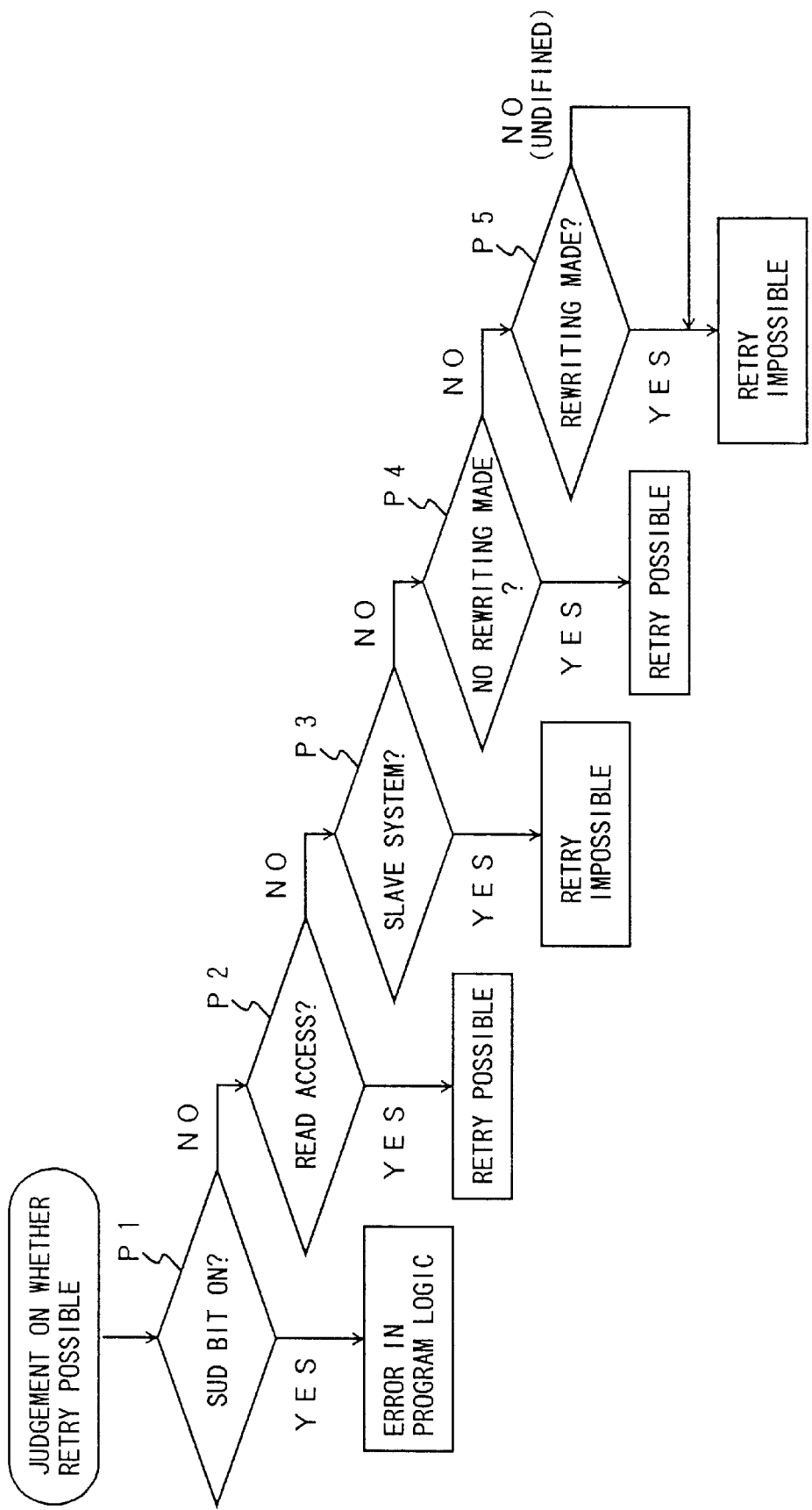
FIG. 17 is a flow chart for explaining the process of deciding whether or not the retry is possible in the conventional system.

FIG. 17 is a flow chart for explaining the process of deciding whether or not the retry is possible in the conventional system shown in FIG. 1. In FIG. 17, steps P1 through P5 respectively correspond to the steps R1 through R5 shown in FIG. 16, and a description thereof will be omitted.

As may be seen by comparing FIGS. 16 and 17, the second embodiment can make the retry of the exclusive control instruction possible for two additional cases indicated by the hatching in FIG. 16. In other words, even if the slave shared memory module is detected and the decision result in the step R3 is YES, it becomes possible to retry the exclusive control instruction. In addition, even if there is no guarantee that no rewriting has been made with respect to the master shared memory module and the decision result in the step R5 is NO, it becomes possible to retry the exclusive control instruction if the decision result in the step R6 is YES.

Further, the present invention is not limited to these embodiments, but various variations and modifications may be made without departing from the scope of the present invention.

What is claimed is:

1. A method of recovering an exclusive control instruction for a resource in a computer system having a plurality of processor modules coupled to a plurality of shared memory modules via a system bus, at least a part of said shared memory modules forming a dual construction in which a current shared memory module is paired with a back-up shared memory module, said method comprising the steps of:

(a) making a read access to data, indicating whether a resource is free, in a current shared memory module from an arbitrary processor module in response to the exclusive control instruction to determine if the resource is free;

(b) if the resource is free, making a write access to a back-up shared memory module from said arbitrary processor module after said step (a) so as to rewrite data in said back-up shared memory module to indicate that the resource is taken; and (c) making a write access to said current shared memory module from said arbitrary processor module after said step (b) so as to rewrite data in said current shared memory module to indicate that the resource is taken.

2. The method as claimed in claim 1, which further comprises the step of:

(d) retrying the exclusive control instruction when an abnormal termination of the exclusive control instruction occurs during the read access of said step (a).

3. The method as claimed in claim 1, which further comprises the step of:

(d) retrying the exclusive control instruction when an abnormal termination of the exclusive control instruction occurs during the write access of said step (b).

4. The method as claimed in claim 1, which further comprises the step of:

(d) providing a flag indicative of whether the data in said current shared memory module was rewritten in said step (c), said flag being accessible by each of the processor modules.

5. The method as claimed in claim 4, wherein said step (d) sets and resets the flag in said current shared memory module.

6. The method as claimed in claim 4, wherein said step (d) sets said flag in response to the read access in said step (a) and resets said flag in response to a normal termination in the write access of said step (c).

7. The method as claimed in claim 4, which further comprises the step of:

(e) retrying the exclusive control instruction when said flag indicates that the data in said current shared memory module has not been rewritten.

8. A multi-processor system comprising:

a plurality of processor modules;

at least one resource for which exclusive control is given to a requesting one of said plurality of processors;

a plurality of shared memory modules accessible by each of said processor modules, at least a part of said shared memory modules forming a dual construction in which a current shared memory module having data indicating whether said at least one resource is free, the current shared memory module is paired with a back-up shared memory module;

a system bus coupling said processor modules to said shared memory modules; and at least one of said plurality of processor modules comprising:

first means for making a read access to the data in a current shared memory module to determine if a resource is free in response to executing an exclusive control instruction for the resource;

second means for making a write access to said back-up shared memory module after carrying out the read access of said first means and determining that the resource is free so as to rewrite the data in said back-up shared memory module indicating that the resource is taken; and third means for making a write access to said current shared memory module after carrying out the write access of said second means so as to rewrite the data in said current shared memory module indicating that the resource is taken.

9. The multi-processor system as claimed in claim 8, wherein said arbitrary processor means further comprises:

means for retrying the exclusive control instruction when an abnormal termination of the exclusive control instruction occurs during the read access carried out by said first means.

10. The multi-processor system as claimed in claim 8, wherein said arbitrary processor means further comprises:

means for retrying the exclusive control instruction when an abnormal termination of the exclusive control instruction occurs during the write access carried out by said second means.

11. The multi-processor system as claimed in claim 8, which further comprises:

fourth means for providing an indication of whether the data in said current shared memory module has been rewritten by said third means, said fourth means being accessible from each of the processor modules.

12. The multi-processor system as claimed in claim 11, wherein said fourth means sets and resets a flag in said current shared memory module.

13. The multi-processor system as claimed in claim 11, wherein said fourth means sets a flag in response to the read access of said first means and is reset in response to a normal termination of the write access of said third means.

14. The multi-processor system as claimed in claim 11, wherein said arbitrary processor module further comprises:

fifth means for retrying the exclusive control instruction when said flag indicates that the data in said current shared memory module has not been rewritten.

* * * * *